(12) United States Patent
Lazar (10) Patent No.: US 12,249,258 B2
(45) Date of Patent: Mar. 11, 2025

(54) JEWELRY FORM FACTOR WITH EMBEDDED FUNCTIONALITY AND ADORNED WITH EMBELLISHMENTS

(71) Applicant: Notocard LLC, Lawrence, NY (US)

(72) Inventor: Chanie Lazar, Lawrence, NY (US)

(73) Assignee: Notocard LLC, Lawrence, NY (US)

( * ) Notice: Subject to any disclaimer, the term of this patent is extended or adjusted under 35 U.S.C. 154(b) by 0 days.

(21) Appl. No.: 18/346,333

(22) Filed: Jul. 3, 2023

(65) Prior Publication Data

US 2023/0339251 A1 Oct. 26, 2023

Related U.S. Application Data

(63) Continuation-in-part of application No. 18/046,425, filed on Oct. 13, 2022, which is a continuation of application No. 16/620,202, filed as application No. PCT/US2018/036283 on Jun. 6, 2018, now Pat. No. 11,498,355.

(60) Provisional application No. 62/515,798, filed on Jun. 6, 2017.

(51) Int. Cl.
| | |
|---|---|
| *G09F 3/20* | (2006.01) |
| *B42D 15/02* | (2006.01) |
| *G06F 1/16* | (2006.01) |
| *G09F 9/30* | (2006.01) |
| *G09F 9/33* | (2006.01) |
| *G09F 9/35* | (2006.01) |
| *B42D 15/04* | (2006.01) |
| *B44C 1/18* | (2006.01) |
| *B44C 1/22* | (2006.01) |

(52) U.S. Cl.
CPC ............ *G09F 3/208* (2013.01); *B42D 15/02* (2013.01); *G06F 1/163* (2013.01); *G09F 9/30* (2013.01); *G09F 9/33* (2013.01); *G09F 9/35* (2013.01); *B42D 15/042* (2013.01); *B44C 1/18* (2013.01); *B44C 1/225* (2013.01); *B44C 1/227* (2013.01); *B44C 1/228* (2013.01)

(58) Field of Classification Search
CPC ... G09F 3/208; G09F 9/30; G09F 9/33; G09F 9/35; B42D 15/02; B42D 15/042
USPC .......................................................... 455/566
See application file for complete search history.

(56) References Cited

U.S. PATENT DOCUMENTS

| | | | |
|---|---|---|---|
| 2015/0189403 A1* | 7/2015 | Magi ..................... | A44C 5/0015 340/870.07 |
| 2016/0021683 A1* | 1/2016 | Sood ..................... | H04W 76/50 455/404.1 |
| 2017/0185102 A1* | 6/2017 | Yong ...................... | G06F 1/163 |

* cited by examiner

*Primary Examiner* — Ajibola A Akinyemi
(74) *Attorney, Agent, or Firm* — FisherBroyles, LLP; Susan M. Oiler (57) ABSTRACT

A personalized and intrinsically valuable jewelry form factor or greeting card that includes electronic functionality. In an embodiment, one form factor is metallic, rectangular device with overall thickness of 3 mm that is credit-card sized. Embedded inside the form factor are electronic components giving rise to its functionality such as processing, data storage, messaging display, user input, wireless charging facilities, battery compactly disposed inside of a 2 mm cavity. Further, the form factor provides strength with a wall thickness of 0.5 mm and made of titanium, or the like.

21 Claims, 7 Drawing Sheets

JEWELRY FORM FACTOR WITH EMBEDDED FUNCTIONALITY AND ADORNED WITH EMBELLISHMENTS

CROSS REFERENCE TO RELATED APPLICATIONS

This application is a Continuation-in-part of U.S. Non-Provisional application Ser. No. 18/046,425, filed on Oct. 13, 2022, which is a continuation of U.S. Pat. No. 11,498, 355, issued Nov. 15, 2022, entitled "Combination Greeting Card," filed Dec. 6, 2019 as U.S. Nonprovisional Ser. No. 16/620,202, which is a national phase entry of international patent application No. PCT/US2018/036283 filed Jun. 6, 2018, and which claims the benefit of priority from U.S. Provisional Application No. 62/515,798, the disclosures of which are incorporated, in their entirety, herein by reference, for all purposes.

TECHNICAL FIELD

This application relates generally to jewelry form factors, more particular jewelry form factors, such as greeting cards, that are adorned with embellishments and that have a display and a processor configured to display a real time communication from the sender to the recipient.

BACKGROUND

The greeting card industry and fine jewelry industry are competitive industries where attempts are constantly made to produce novel features for greeting cards and/or fine jewelry. However, the greeting card industry suffers from several issues thought to be inherent to the industry. For example, after a person has received a greeting card, they are typically soon simply discarded and the message which was contained in the greeting card is lost, forgotten, or ignored. Even when greeting cards are saved, they are typically stored in a box or other protective casing because their traditional materials (e.g., paper) make them relatively fragile to daily use. Thus, typical greeting cards have limited effectiveness as long-lasting methods of communication of human sentiments between individuals. There is a need for novel greeting cards that have an intrinsic gift value that will be kept so that the message that was originally conveyed is preserved, as well as for greeting cards that have ongoing functional utility.

Further, as some greeting cards have emerged that do have some limited functionality, it is typically limited to minimal audio recordings that cannot be changed or repurposed. Further yet, even with slightly improved functionality, the consumer perception remains that such a "paper" greeting card is to be discarded or otherwise disposed. There is a need for enough improved functionality in a form factor that reaches beyond the perceived connotation that greeting cards are disposable by providing intrinsic value to such a form factor that also includes improved functionality capable of repurpose.

BRIEF DESCRIPTION OF THE DRAWINGS

Embodiments of the subject matter disclosed herein in accordance with the present disclosure will be described with reference to the drawings, in which.

Note that the same numbers are used throughout the disclosure and figures to reference like components and features.

DETAILED DESCRIPTION

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. These systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

By way of an overview, the systems and methods discussed herein may be directed to a personalized and intrinsically valuable jewelry form factor, such as a metal gift card suited for jewelry connoisseurs that also includes electronic functionality. As wearable technology is trending, one cottage industries is digital jewelry that is both aesthetic and functional with jewel-like smart electronic devices. Such wearable, jewel-like technology provides different aspects of value for a user. Not only is there a fashion aspect but there is also embedded functionality. In an embodiment, one form factor is a metallic, rectangular device with an overall thickness of 3 mm, which is approximately credit-card sized. Embedded inside the form factor are electronic components giving rise to its functionality such as processing, data storage, messaging display, user input, wireless charging facilities, battery compactly disposed inside of a 2 mm cavity. Further, the form factor provides strength with a wall thickness of 0.5 mm and made of titanium, or the like.

In other embodiments, the functional jewelry with embellishments may be in the form factor of a greeting card that includes an intrinsic value. By providing a greeting card which has an intrinsic value, the underlying value and gift may be combined with the greeting card, an advantage over traditional greeting cards. In certain embodiments, the greeting cards of this disclosure comprise combinations and arrangements of one or more of the following: a base material comprised of metal, metal alloy, composite material, or other durable material which may also carry intrinsic value; engraving or embossment on the base material; adornment with gemstones or precious metals; and electronic features, such as an electronic text display, video display, or audio device. These aspects as well as others are discussed below and are rendered with greater detail and description when taken in concert with FIGS. 1-8.

Figure 1:
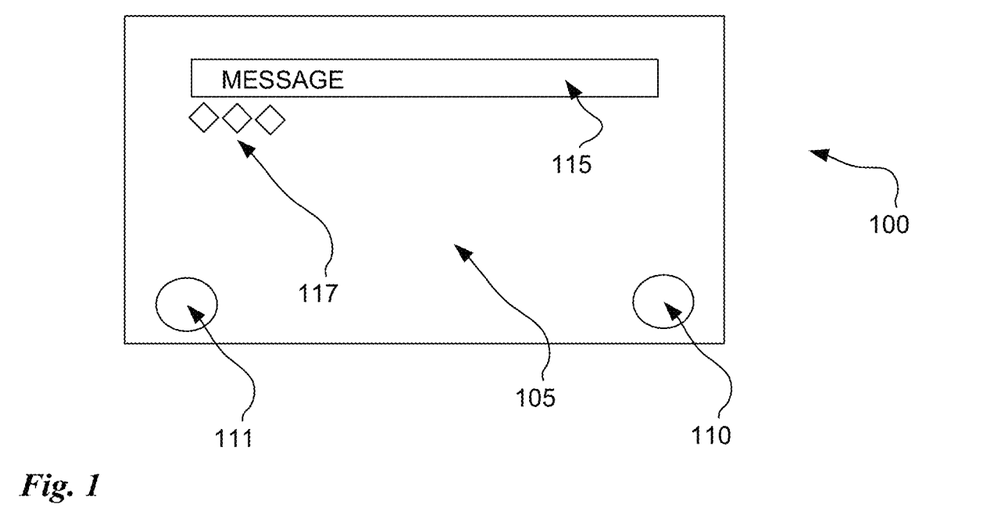
FIG. 1 is a plan view of a jewelry form factor having improved functionality according to an embodiment of the subject matter disclosed herein.

FIG. 1 is a plan view of a jewelry form factor 100 having improved functionality according to an embodiment of the subject matter disclosed herein. In this embodiment, the form factor 100 is rendered as a credit-card like structure having generally, a flat rectangular shape with dimensions of approximately 86 mm by 55 mm and with a thickness of approximately 3 mm. A "form factor" as used with respect to computers means the size, configuration, or physical arrangement of a computing device, including for example the arrangement of the device, the case or chassis, and/or one of its internal components such as a motherboard or a daughterboard. The form factor 100 may be comprised of a base material 105 having intrinsic value in and of itself. Further, the form factor 100 many also include one or more gemstones 117 set in the base material 105 in any manner suitable for jewelry. In some embodiments, the plurality of gemstones 117 are set in the base material 105 in a pre-determined fashion. The plurality of gemstones 117 can be prong settings, pave settings, bar settings, channel settings, bezel settings, tension settings, or combinations thereof. The form factor 100 may also include additional engravings (not shown) by a laser, acid etching, or mechanical means.

The base material 105 may further comprise metal, metal alloy, composite material, or other durable material which may also carry intrinsic value. In one embodiment, the base material comprises titanium or a titanium alloy. In other embodiments, the base material comprises precious metals, such as silver, gold, or platinum or their alloys. Those skilled in the art will recognize that other metals suitable for formation into the shape of form factor as shown may be utilized, such as aluminum, brass, chromium, cobalt, iron, INCONEL® metal alloys available from Special Metals Corporation, which are austenitic nickel-chromium-based superalloys, manganese, molybdenum, steel, titanium, tungsten, vanadium, related compositions, and combinations thereof. The base material may also comprise composite materials, including reinforced plastics, metal composites, and ceramic composites. An example of a suitable composite is carbon fiber.

In all embodiments, the base material can be surface coated. In some embodiments, the base material is, silver-plated, gold-plated, nickel-plated, palladium-plated, platinum-plated, rhodium-plated, or zinc-plated. In some embodiments, the base material is polymer-coated, plastic-coated, resin-coated, acrylic-coated, vinyl-coated, or painted. In some embodiments, the base material is coated with PVD. In some embodiments, the base material is finished. In some embodiments, the base material is polished, buffed, ground, or blasted. In some embodiments, the base material 105 is microbead-blasted or mirror polished.

In all embodiments, the form factor 100 can comprise a plurality of gemstones set in the form factor 100. In some embodiments, the plurality of gemstones is set in one or more sides of the form factor 100. In some embodiments, the gemstone comprises a precious gemstone. In other embodiments, the gemstone comprises a semi-precious gemstone. In some embodiments, the gemstone comprises a diamond, sapphire, ruby, emerald, pearl, or other related gemstone. In some embodiments, the gemstone comprises a pink diamond or diamonds or another natural or non-natural colored diamond or diamonds.

As shown in this embodiment, the form factor 100 includes at least one electronic component and in the view shown, one can see a display screen 115 as well as two user input buttons 110 and 111. In some embodiments, the at least one electrical component is located on one or more sides of the greeting card. In some embodiments, as detailed in subsequent figures, the at least one electronic component comprises one of an antenna, speaker, headphone jack, near field communication (NFC) device, radio-frequency identification (RFID) tag/chip, Wi-Fi dongle, microphone, Bluetooth adapter/dongle, Bluetooth low energy (BLE), solar cell, fingerprint sensor, LED light/flashlight, laser, camera lens, display screens, and activation button. In some embodiments, the form factor 100 comprises cellular data capabilities. In some embodiments, the display screen 115 comprises an electronic ink (E-ink) display screen or other commercially available display screens or those hereinafter developed. In some embodiments, the form factor 100 further comprises at least one memory storage device. In some embodiments, the memory device is interconnected to at least one additional electrical component. In some embodiments, the form factor 100 further comprises a battery. In some embodiments, the battery is interconnected to at least one electrical component. In some embodiments, the battery is rechargeable or non-rechargeable. In some embodiments, the form factor 100 further comprises an I/O port. In some embodiments, the I/O port is a USB port. In some embodiments, the greeting card further comprises a charging port. Several electronic aspects of the form factor 100 of FIG. 1 are discussed in greater detail below with respect to FIG. 3.

As shown in this embodiment of FIG. 1, the form factor 100 has a thickness of generally 3 mm but may vary from about 0.5 mm to about 5.0 mm and any intervening ranges therein. In some embodiments, the form factor 100 has an overall rectangular geometric shape, but the overall shape may also be a rectangle with rounded edges, square, triangle (including equilateral, isosceles, scalene, right, obtuse, and acute), rhombus, parallelogram, trapezoid, kite, trapezium, pentagon, hexagon, heptagon, octagon, nonagon, decagon, circle, ellipse, crescent, or any other regular or irregular polygon. In some embodiments, the form factor 100 in generally in the shape of a regular polygon, such as a rectangle, with one or more protruding tabs on one or more edges of the form factor 100. The form factor 100 may additionally have an aperture, which may be on the protruding tab or elsewhere, to enable the card to be attached to another object. The protruding tab may also be decorated and may function to aid in the removal of the card from a wallet, purse, or other carrying case. In another embodiment the form factor 100 is a flat shape of the foregoing dimensions having only two sides (e.g., a front side and back side). In other embodiments, the form factor 100 may be folded or bent, such as in the shape of a traditional paper greeting card (e.g., two rectangular panels connected on one side) or any other multi-dimensional shape.

Figure 2A:
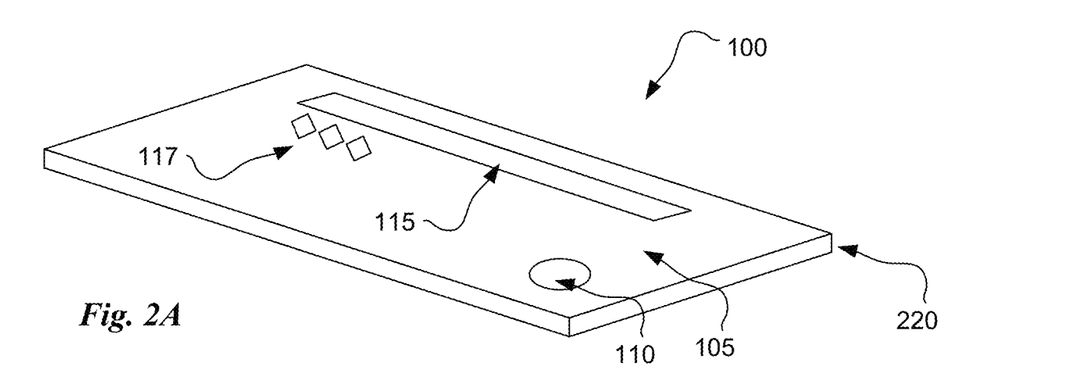
FIG. 2A is an isometric view of a jewelry form factor having improved functionality according to an embodiment of the subject matter disclosed herein.

FIG. 2 is an isometric view of the jewelry form factor 100 of FIG. 1 having improved functionality according to an embodiment of the subject matter disclosed herein. As can be seen, the same sets of functional and jewel-like embellishments are shown. In other embodiments, the form factor 100 may also be a greeting card though not shown as such in this figure. Nevertheless, several aspects of the underlying functionality may be embodied in a greeting card form factor as well. Thus, the present disclosure relates to a greeting card and can be applied to one or more sides of such a card. The greeting card generally has a base material, for example a base metal or metallic composition. In all embodiments, the greeting card or jewelry form factor is adorned or embellished with an engraving, a surface coating design, or at least one gemstone, e.g., a precious or semi-precious stone, set in the base material in any manner suitable for jewelry, and may optionally contain one or more electronic components, for example, capacitive touch element (or other activation button), a display screen, a built-in speaker, and other such elements. FIG. 2 displays one side of an exemplary greeting card, having a display screen 115, display activation buttons 110 and 111, and a base material 105. Further, the form factor 100, as shown in FIG. 2, has a thickness 220.

As before, the base material 105 typically comprises a metal or metallic composition but may also comprise other durable materials capable of being used with the other elements of the disclosed inventions and may additionally have its own intrinsic value. Durability of the base material is of importance so that the greeting card, unlike traditional greeting cards, is preservable without fear of damage to the greeting card. Traditional greeting cards made of paper, for example, must be handled with caution if they are to be preserved, and even in such instances, are subject to decay and damage over time due to the underlying organic material. Unlike the traditional greeting cards, the greeting cards of the present disclosure are capable of being presented, worn, or kept in a wallet, for example, without concern of damage to the greeting card.

For example, in an embodiment, the base material comprises titanium or titanium alloy, however the base material is not limited as such. The base material should be oxidation and corrosion resistant, and preferably displays good strength, including yield strength, compressive strength, tensile strength, and impact strength. Titanium, including alloys of titanium, represents a durable base material because, in addition to being oxidation and corrosion resistant, it has the highest tensile strength-to-density ratio of any metallic element. The base material can comprise any of the following, explicitly non-limiting metals (including alloys thereof): aluminum, brass, chromium, cobalt, iron, manganese, molybdenum, steel, titanium, tungsten, vanadium, related compositions, and combinations thereof. In particular, titanium can be alloyed with several other metals to produce strong, lightweight alloys. For example, titanium can be alloyed with iron, aluminum, vanadium, molybdenum, and several other metals. In certain embodiments, the base material may also carry intrinsic value. In some embodiments, the base material comprises precious metals, such as silver, gold, or platinum or their alloys.

The base material may also comprise composite materials, including reinforced plastics, fibers (such as aramid), metal composites, and ceramic composites. An example of a suitable composite is carbon fiber. While such base materials are desirable, some do pose challenges for embedding gemstones and other ornamental features. For example, there are particular challenges with embedding diamonds in titanium, particularly thin dimensions of titanium, which require unique techniques and skill. Such techniques may include prong sets, bezel settings, or burnishing.

The base material may be surface-coated or anodized. For example, the base material may be PVD plated, e.g., black-PVD plated titanium, silver-plated, e.g., silver-plated titanium, or may be gold-plated, e.g., gold-plated titanium. Other plating may include, for example, nickel, palladium, platinum, rhodium, zinc, related compositions, and combinations thereof. Non-metallic surface-coatings are possible, and may include polymer coatings, plastic coatings, resin coatings, acrylic coatings, vinyl coatings, painted coatings, or related coatings. For example, titanium may be anodized to create titanium of many different colors, for example, bronze, blue, blue-white, yellow, magenta, cyan, and green titanium, or combinations thereof. It should be appreciated, however, that while various surface coatings and colorings may be desirable, the size and dimensions of the greeting card of the instant invention pose certain challenges in the coating and coloring process, since standard jeweler equipment and procedures may not be suitable. It has been found that the typical processes jewelers employ for jewelry lead to non-uniform coloring and blemishes on the greeting card, which are not desired.

The base material, optionally surface-coated, may also be finished. For example, the base material may be polished, buffed, brushed, ground, or blasted, e.g., microbead-blasted. Polishing typically refers to a more aggressive version of buffing, which typically results in a smoother finish. The finish depends on the desired aesthetic from rough to smooth, and may be patterned, e.g., a striped pattern. For high tensile strength metals such as titanium, typically aluminum oxide (e.g., white or grey aluminum oxide) or a related composition, such as chromium oxide, is used. For brittle substances, silicon carbide is typically used. Mirror finishing typically requires polishing and buffing compounds, typically employing high speed polishing machines.

The greeting card may be engraved or etched, for example with a word, phrase, or other symbol or image, such as artwork. These can be customized for specific consumers, e.g., as per customer or purchaser desire. Engraving may occur by any means known in the art, including via mechanical means, for example using a pneumatic engraver or a drill bit (e.g., tungsten-carbide or diamond-coated drill bit), by laser engraving, by chemical etching (e.g., through application of an acid), engraving with enamel, photochemical etching, and related methods. The engraving method may be utilized to create a Guilloche pattern on the greeting card.

The engraving process may be guided by a computer program or set of readable/executable instructions stored in non-transitory medium.

The base material may be adorned with at least one intrinsically valuable items, such as a gemstone, or other physical item of intrinsic value or extrinsic significance. The gemstone is generally a precious or semi-precious stone, but any suitable gemstone may be used. In one exemplary embodiment, the gemstone comprises a diamond, however the gemstone is not limited as such. The diamonds may be natural, treated, or synthetic and is set in the metal or metal alloy material of the form factor in any manner suitable for jewelry.

Methods for producing treated and synthetic diamonds are known to one of skill in the art. The diamonds can be white (i.e., natural diamonds) or any other color in addition to pink, for example but not necessarily limited to, yellow diamond, blue diamonds, champagne diamonds, black diamonds, purple diamonds, green diamonds, brown diamonds, red diamonds, grey diamonds, olive diamonds, orange diamonds, and combinations thereof.

The gemstone can comprise any known gemstones, including but not limited to the following: afghanite, agate, alexandrite, amazonite, amber, amethyst, ametrine, ammolite, andalusite, andesine, apatite, aquamarine, aventurine, azurite, bastnasite, benitoite, beryl, bloodstone, calcite, carnelian, cavansite, chalcedony, charoite, chrome diopside, chrysoberyl, chrysocolla, crysoprase, citrine, coral, crinoid, danburite, diamond (e.g. pink diamond), diaspore, diapotase, druzy, emerald, eudialyte, feldspar, fire agate, fluorite, fuchsite, garnet, hackmanite, heliodor, hematite, hiddenite, howlite, iolite, ironstone, jade, jasper, kunzite, kyanite, labradorite, lapis lazuli, larimar, lava rock, lazurite, lepidolite, magnetite, malachite, meteorite, moldavite, moonstone, morganite, obsidian, onyx, opal/opalite, orthoclase, pearl (e.g. akoya or black pearl), peridot, petalite, pietersite, prasiolite, prehnite, pyrite, quartz, rhodochrosite, rhodonite, rhyolite, rubelite, ruby, sapphire, scapolite, selenite, septarian, seraphinite, serpentine, shellstone, sillimanite, sodalite, spectrolite, sphalerite, sphene, spinel, spodumene, stichtite, sugilite, sunstone, tanzanite, tekite, tiffany stone, tiger eye, tiger iron, topaz, tourmaline, tremolite, triphane, turkiyenite, turquoise, variscite, verdite, zebra rock, zircon, zoisite, and combinations thereof.

In some embodiments, the greeting card contains a plurality of gemstones, the gemstones set in one or more surfaces of the base material (e.g., one or more sides and/or edges of the base material) in a pre-determined pattern, for example, an image or message, such as depicted in FIGS. 1-2. Individual gemstones in the plurality of gemstones may comprise different gemstones. Thus, the greeting card may have a message that is engraved into the card or may have a message that is formed by gemstones (e.g., diamonds) that are set in the base material, or may have a combination of both. In addition, or as an alternative, to being set in one or more sides of the greeting card, individual gemstones may be set along one or more edges of the greeting card. In certain embodiments, one or more portions of one or more edges have gemstones set therein. In one exemplary embodiment, one or two complete edges have gemstones set therein. In certain embodiments, the greeting card may have one or more protruding tabs from one or more edges, which may have gemstones set therein. One advantage to having gemstones set along one or more edges is that such features may be seen even when the greeting card is stored in a wallet, purse, or carrying case, as long as one edge is showing. For example, a greeting card of the present invention stored in a wallet would have at least one edge visible whenever the wallet is opened, even if the card is not removed. Not only does this serve the function of reminding the holder of the sentimental (and intrinsic) value of the greeting card even when the greeting card is not removed, but also it aids the holder in quickly locating the greeting card among other items stored in the wallet, purse, and the like.

The gemstones may be of any dimension, size, and weight that they may be permanently set in the greeting card. In some embodiments, the gemstones are of a dimension such that they do not protrude above the surface plane of the side of the base material within which they are set. In alternative embodiments, it may be desirable to have the gemstones dimensioned such that when set along an edge of the greeting card they do protrude above the surface plane of the edge. While the gemstones may have any dimension that will fit on and is capable of being set in the greeting card, in some embodiments, the gemstones have a diameter of about 1 mm and 1.5 mm or a depth of about 1 mm to 1.1 mm.

The greeting card may contain one or more electronic components. The electronic components may be housed entirely inside the greeting card, or they may be exposed (either partially or fully) on a surface or surfaces (e.g., one or more sides) of the greeting card. The electronic components may be interconnected (or operatively linked) through wiring or circuitry to one another, and are optionally connected to a power source, for example, a battery. The wiring and/or circuitry may be housed entirely inside the greeting card, or they may be exposed (either partially or fully) on a surface of the greeting card. Exemplary electronic components include an activation button and display screen. The display screen may comprise an LCD screen, LED screen (including OLED), or electronic ink (E-ink) display, and depending on the screen type may or may not be backlit. The activation button may be a physical button that actuates upon application of external force or may alternatively comprise a capacitive touchscreen. The activation button may be interconnected/operatively linked to any number of additional electronic components described herein.

Other electronic components may include antennas, speakers, headphone jacks, near field communication (NFC) devices, radio-frequency identification (RFID) tags/chips, Wi-Fi dongles, microphone, Bluetooth adapter/dongle, Bluetooth low energy (BLE), solar cell, fingerprint sensor, LED light/flashlight, laser, camera lens, display screen and related components.

In particular, the greeting card may utilize Bluetooth low energy (BLE) technology which may allow the greeting card to communicate with other electronic devices, for example, a mobile device such as a cell phone, tablet, laptop, or other computing device. In some embodiments, the mobile device contains software or executable instructions, such as in the form of an app, which allows the user or a third party to modify or interact with the greeting card. For example, a greeting card having BLE technology and a display screen, for example but not necessarily an electronic ink screen, may allow a user or third party to transmit, change, or modify a message on a display screen of the greeting card with software contained on that user or third party's mobile device. In some embodiments, the greeting card comprises a cellular data receiver or transmitter, which enables the greeting card to receive commands and, with a display screen, display messages, including text messages, or other custom displays. Such commands, messages, and displays may be received via SMS text messages, mobile applications compatible with the greeting card, or other messaging functionality from cellular phones or computers.

The greeting card may include a memory storage device, for example read-only memory (ROM) having pre-loaded executable files or random-access memory (RAM), or alternatively a flash memory drive, wherein the greeting card may further comprise an I/O port, for example, a universal serial bus (USB, including micro-USB, USBc, USB 3.0 etc.) port, thunderbolt port, or related interface. In such embodiments the greeting card may double function as a storage drive for the user, or may be pre-loaded with additional greetings, messages, or files for the recipient of the greeting card. For example, the greeting card could be programmed to automatically display a greeting at a specific time, to play a specific song out of a speaker when an activation button is pressed, or a user could record a voice message into a microphone, which then is played through a speaker when an activation button is pressed. This could be in combination with a display screen, which likewise, may or may not contain a customized or automatic message. In some embodiments of the greeting card has the novel capability of allowing receipt of post gift new greeting messages sent and received live in real time. The diamond/gemstone and other intrinsic value environment of the card may make the new greeting as fresh and personal as the original card. Pre-loaded executable files in the greeting card may also serve to run the various electronic components and may be customizable depending on the sender's or user need.

The greeting card may additionally comprise a power source, e.g., a battery. The battery may be housed entirely inside the greeting card, or it may be exposed (either partially or fully) on a surface of the greeting card. The battery may be a rechargeable battery, or a non-rechargeable battery, e.g., a watch battery. The battery may be interconnected to any number of electronic components described herein. Common rechargeable battery types include, but are not limited to, lead acid gel batteries, lithium-ion (Li-ion) batteries, including but not limited to lithium-ion polymer batteries, nickel-cadmium (NiCd or Nicad) batteries, and nickel metal hydride batteries. Common non-rechargeable batteries include, but are not limited to, alkaline batteries, carbon zinc batteries, lithium batteries, mercury batteries, silver oxide batteries, and zinc air batteries. In instances where the greeting card comprises a rechargeable battery, the greeting card may (but not necessarily) may further comprise a charging port, which may or may not be a USB charging port. Alternatively, the greeting card may comprise electronic components for wireless inductive (Qi) charging or may comprise a solar cell as disclosed above.

The greeting card may be manufactured from a unitary, solid base material upon which all other features are embedded or affixed. The greeting card may also be manufactured with two or more base material portions that are affixed together to house other features. For example, electronic components could be inserted into a cavity of a unitary base material, or electronic components could be housed between two or more base material portions.

The greeting card may additionally have means for affixing or attaching the greeting card to another object. For example, the greeting card may have one or more apertures through which a strap or hook could be inserted. The apertures may be through the face of the greeting card or through a protruding tab. In this manner, the greeting card could be used as a decorative tag on a handbag, purse, briefcase, luggage, or the like.

Similarly, the greeting card could be hung decoratively in a home or office or attached to be wearable on clothing, e.g., the greeting card may be wearable by a user. Additionally, the greeting card may have one or more aperture(s), through which, for example, threading or similar materials such as chains could pass through to allow the greeting card to be hung. In an alternative embodiment, the greeting card may have an integrated magnet, permitting the greeting card to be magnetically attached to a ferromagnetic surface. In another alternative embodiment, the base material may comprise a ferromagnetic metal, enabling the greeting card to be magnetically attached to a magnetic surface.

The overall shape of the greeting card may be any geometric shape or non-geometric shape. In some embodiments, the shape of the greeting card is rectangular with rounded edges. In some embodiments, the greeting card may have a protrusion (e.g., a tab) on a side of the greeting card. In some embodiments the protrusion may be have at least one gemstone set therein, for example, as shown in FIG. 2. The geometric shape (length and width, notwithstanding thickness) of the greeting card may be, for example, a rectangle, square, triangle (equilateral, isosceles, scalene, right, obtuse, acute), rhombus, parallelogram, trapezoid, kite, trapezium, pentagon, hexagon, heptagon, octagon, nonagon, decagon, circle, ellipse, crescent, or any other regular or irregular polygon. The edges of the greeting card may be smooth or rounded. In some embodiments, the greeting card in generally in the shape of a regular polygon, such as a rectangle, with one or more protruding tabs on one or more sides of the greeting card. In some embodiment the greeting card is a flat shape of the foregoing dimensions having only two sides (i.e., a front side and back side). In other embodiments, the greeting card may be folded or bent, such as in the shape of a traditional paper greeting card (e.g., two rectangular panels connected on one side) or any other multi-dimensional shape The dimensions of the greeting card do not necessarily have any maximum dimensional limitation. However, preferably the greeting card has a thickness sufficient to withstand ordinary force, and length and width that are similar to but slightly smaller than other types of cards typically carried in a wallet or purse (so as to be easily distinguishable from such items) for ease of carrying in a wallet, or similar to a luggage tag for ease of affixing to a handbag, purse, or keychain, or for ease of display. Having length and width dimensions smaller than a typical credit card, coupled with a distinct look and feel, permits the greeting card to be easily distinguished from other cards typically carried in a wallet or purse, which aids the holder in locating the greeting card quickly so that it can be removed or not removed as desired. The difference in dimensions (and look and feel) also make the greeting card noticeable so that even if not removed it still is noticed by the holder and may remind the holder of the sentimental (and intrinsic) value of the greeting card. The greeting card will typically (but not necessarily) have dimensions that are smaller than that of traditional greeting cards.

For example, but not necessarily, the greeting card may have a first dimension (length or width) that is between about 25 to about 150 mm, between about 50 and about 125 mm, between about 50 and about 100 mm, between about 50 and about 75 mm, between about 75 and about 100 mm, between about 60 and about 80 mm, between about 80 and about 100 mm, between about 70 and about 80 mm, between about 65 and about 85 mm, between about 70 and about 90 mm, and any intervening ranges therein. Exemplary greeting cards have a first dimension that ranges from about 73 mm to about 85 mm. The greeting card may have a second dimension (length or width, depending on the first dimension) between about 15 and about 100 mm, between about 20 and about 80 mm, about 25 to about 75 mm, about 25 to about 60 mm, about 25 to about 50 mm, about 40 to about 60 mm, about 45 to about 55 mm, about 50 mm to about 55 mm, about 50 mm to about 60 mm, about and any intervening ranges therein. Exemplary greeting cards have a second dimension of about 54 mm. The thickness of the greeting card may be, but is explicitly not limited to, about 0.5 to about 5.0 mm, about 0.75 to about 4.0 mm, about 1.0 mm to about 1.5 mm, about 0.75 to about 1.5 mm, about 1.0 mm to about 2.0 mm, about 0.75 to about 2.0 mm, about 1.5 to about 2.0 mm, and any intervening ranges therein. In an embodiment without electronics, the greeting card can have a thickness of about 1.2 mm to about 1.3 mm, and more preferably about 1.25 mm. The thickness is preferably such that, based on the composition of the base material, the greeting card may withstand ordinary handling without deformation, yet also is thin enough so as to not be undesirably heavy or take up too much space in a wallet or purse. In the embodiments that include the display screen and electronics, the thickness is typically in a range of 2.5 mm to 5 mm, more preferably about 3 mm.

Figure 2B:
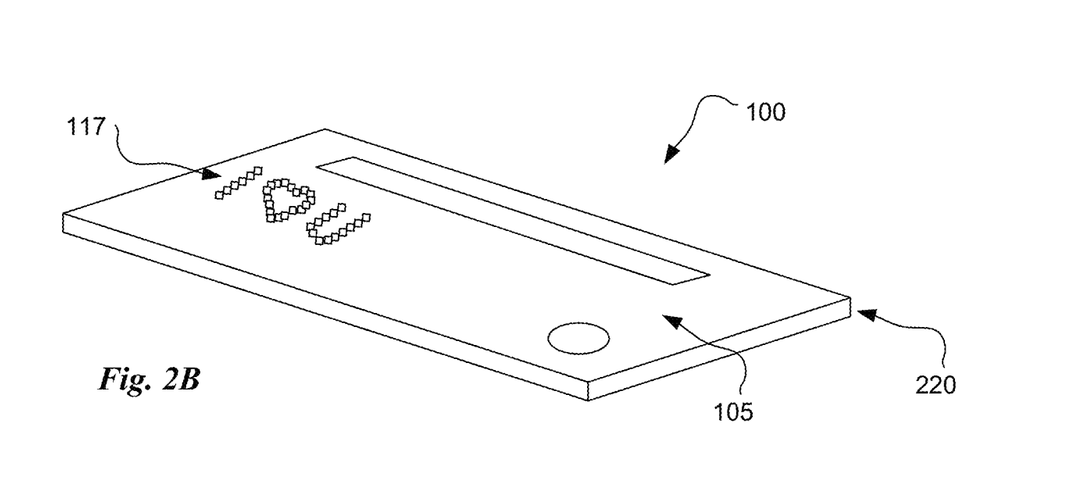
FIG. 2B is another plan view of a jewelry form factor having improved functionality and an embedded message according to an embodiment of the subject matter disclosed herein.

FIG. 2B is another plan view of a jewelry form factor 100 having improved functionality and an embedded message 117 according to an embodiment of the subject matter disclosed herein. In this embodiment, the form factor 100 may still be comprised of a base material 105 having intrinsic value in and of itself. Further, the form factor 100 many also include one or more gemstones 117 set in the base material 105 in a specific manner so as to impart a message or code that remains suitable for jewelry. In some embodiments, the plurality of gemstones 117 are set in the base material 105 in a pre-determined fashion, for example as a moniker such as "I love you" shown in FIG. 2B. The plurality of gemstones 117 can be prong settings, pave settings, bar settings, channel settings, bezel settings, tension settings, or combinations thereof. The form factor 100 may also include additional engravings (not shown) by a laser, acid etching, or mechanical means. As explained in more detail below with respect to FIGS. 5 to 8, the gemstones 117 can be set in the front surface, the back surface, or the sides of the device.

Other form factors are contemplated but not discussed in greater detail herein. The remainder of this disclosure focuses on the electronic componentry and embedded functionality of the form factors discussed.

Figure 3:
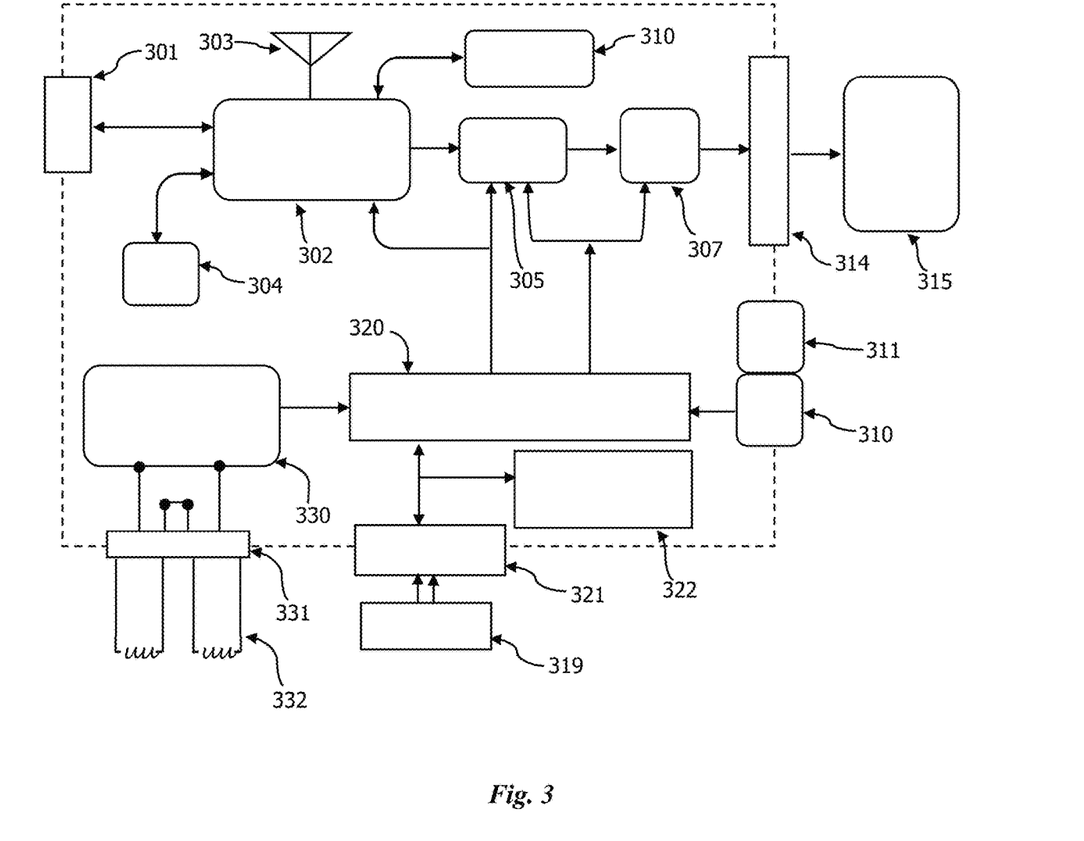
FIG. 3 is a block diagram of electronic components that give rise to the improved functionality of the jewelry form factor of FIGS. 1 and 2 according to an embodiment of the subject matter disclosed herein.

FIG. 3 is a block diagram 300 of electronic components that give rise to the improved functionality of the form factors of FIGS. 1 and 2 according to an embodiment of the subject matter disclosed herein. In FIG. 3, the internal electronic components of the form factor of FIG. 1 are shown. Generally speaking, the electronic componentry is very thin, to the point of fitting within a cavity of the form factor that is approximately two mm thick. Thus, all electronic components are typically arranged to occupy unique planar space within the cavity of the form factor. Further, the components depicted in the block diagram 300 of FIG. 3 may be interconnected through wire tracings such that power and/or data signal may be received and sent between components. Further, wireless power and data signals may be sent and received between some electronic components shown here and external systems and devices. External signals communications are generally discussed below with respect to FIG. 4. For now, the focus will remain on the internal electronic componentry of the jewel form factor with improved functionality.

The jewelry form factor includes a processor 302 in the form of a master control unit (MCU) having System on Chip (SoC) architecture and with Bluetooth low energy (BLE) functionality. Having BLE functionality, an antenna 303 may be coupled to the processor 302 for sending to and receiving from wireless signals from nearby external devices in real time (i.e., real time communication (RTC)). RTC is a term used to refer to any live telecommunications that occur without transmission delays. RTC is nearly instant with minimal latency. RTC data and messages are not stored between transmission and reception. RTC is generally a peer-to-peer, rather than broadcasting or multicasting, transmission. In the present invention, RTC permits messages and images on the jewelry form factor or greeting card to be updated in real time after the initial message or image has been set without an action by the recipient of the jewelry form fact or greeting card. This may be done by the giver of the jewelry form factor or greeting card while the giver is no longer in possession of the jewelry form factor or greeting card or even by a third party other than the giver if permission and/or authentication is granted by the recipient. Further, the processor 302 may occupy a space that is 3.0 mm×3.2 mm (defining an area) and weighs 110 mg. Further, a flash memory 304 may be coupled to the processor 302. In this embodiment, the flash memory may be 32 MB and 3.2 grams, but any size may be utilized so long as space and weight restrictions are observed. Further yet, the processor may be coupled to a debug terminal 301 that allows external devices to be coupled for verifying and/or debugging functionality of the entire system during manufacturing and certification.

If desired, the processor 302 can be configured such that the recipient of the form factor can acknowledge receipt of a message, e.g., an automatic notification to the sender when the message is opened or the ability for the user of the form factor to be able to send an emoji, a generic "message received" response, or to send a customized response message of any kind known or hereinafter developed.

The block diagram 300 further depicts an electronic-ink gray scale display 315 (115 as shown in FIG. 1) that is controlled by the processor 302 and connected to the processor through additional componentry providing interface functionality. Thus, the processor 302 is coupled to a level translator 305 to provide signal-level matching from the processor 302. The level translator 305 is, in turn coupled to a voltage booster circuit 307 for levelling up signals prior to being sent to display interface connector 314. The display interface connector 314 is removably coupled to the electronic-ink display 315. Furthermore, the processor 302 may be coupled to an accelerometer 310 such that the overall orientation of the form factor may be determined. That is, the accelerometer 310 can determine the orientation of the overall device such that the message displayed on the electronic-ink gray scale display 315 may also change to match the orientation of the overall device through control by the processor 302. The overall device may also include two (or more, or less) user input buttons 310 and 311 for controlling certain functionality of the overall device. In one embodiment, one button may be configured to step through different messages displayed in the electronic-ink gray scale display 315. Each user-input button 310 and 311 may be an ultra-miniature tactical switch measuring 3.7×3.7 mm in area.

The block diagram 300 further depicts a lithium-ion battery 319 coupled to the various electronic componentry through a battery connector 321. The lithium-on battery 319 may be a micro thin LiPo battery measuring 0.45 mm×0.45 mm and weighing 0.5 grams. The battery connection terminal 321 may, in turn, be coupled to a battery charger/protection circuit 320 that provides functionality for protecting the circuit from electrical mayhem as well as the ability to recharge the lithium-ion battery 319. The battery connection terminal 321 may also be coupled to a voltage measurement circuit 321 for monitoring battery charge level. Further yet, the battery charger/protection circuit 320 may be coupled to a battery charge circuit that includes a wireless power receiver 330 that may convert energy received through charge coils 332 that are coupled via coils connector 331. The energy may be supplied by an external charging circuit (not shown) positioned near the charge coils to then supply charging current to the battery 319 via the battery charger/protection circuit 320.

Figure 4:
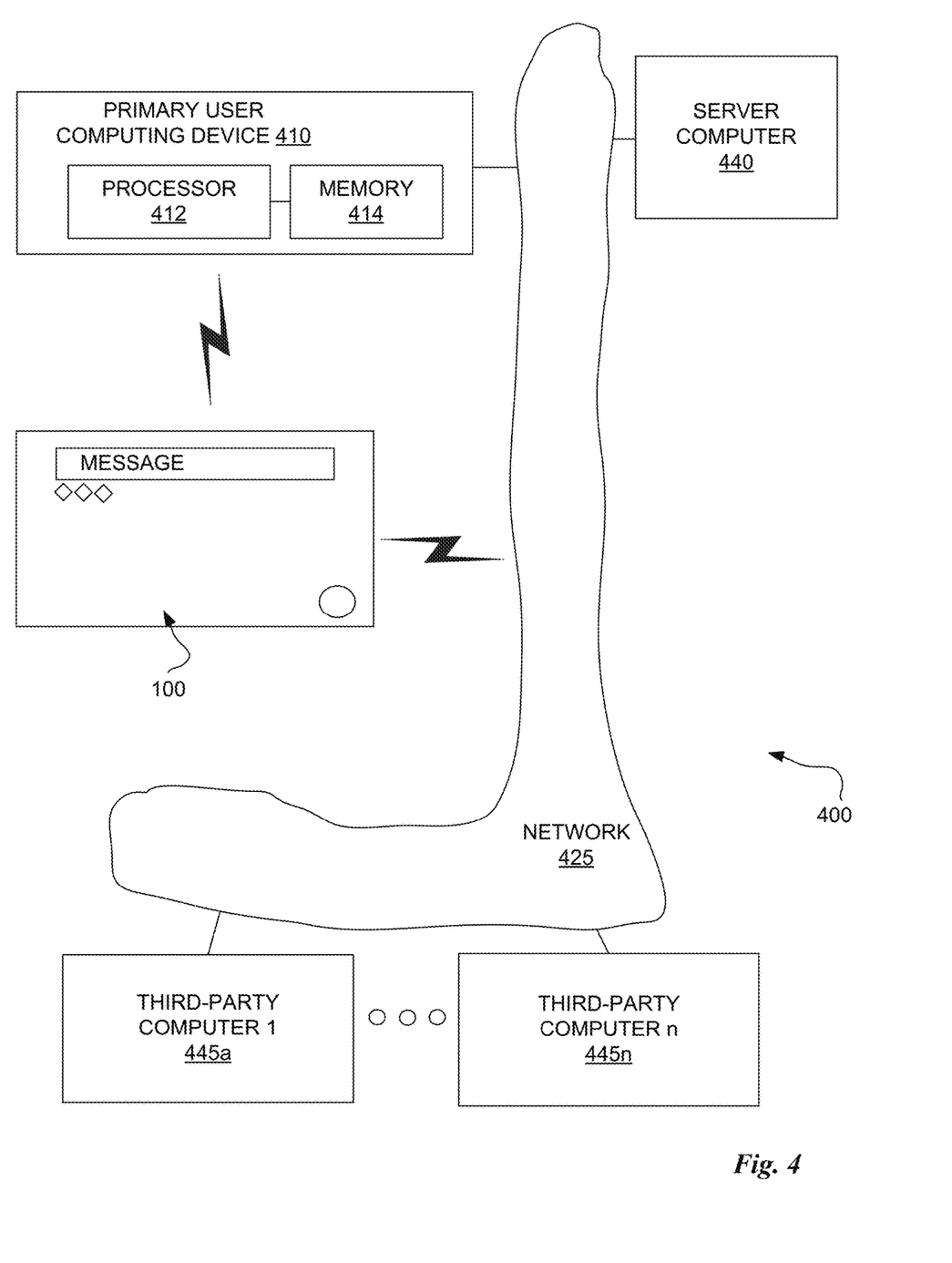
FIG. 4 is a system diagram of a computing environment utilizing the improved functionality of the jewelry form factors of FIGS. 1 and 2 according to an embodiment of the subject matter disclosed herein.

FIG. 4 is a system diagram of a computing environment 400 utilizing the improved functionality of the jewelry form factors of FIGS. 1-3 according to an embodiment of the subject matter disclosed herein. The system includes a number of internetworked computing devices that are collectively, communicatively coupled to each other through a computer network 425, such as the Internet. In this manner, a primary use-computer may be in local wireless communication with the form factor 100 such that communications to and from the form factor 100 may be facilitated though the primary user computer which is communicatively coupled to the network 425 and subsequently any other computer also connected to the network (e.g., the Internet).

The primary user computing device 410 includes a processor 412 and a memory 414 and may typically be a handheld computer device such as a mobile phone or a mobile tablet. In other embodiments, the primary user computing device 410 may be a desktop computer, a laptop computer, or any other computing device capable of interfacing with the network 425. The primary user computing device 410 may be configured to download, install, and execute an application suited to facilitate near-field communications (e.g., BlueTooth™) with the form factor 100. As such, electronic messages intended for or emanating from third-party computing devices 445a-445n may be communicated to the form factor 100 through the personal computing device 410. Similarly, electronic messages intended for or emanating from any server computing devices 440 may be communicated to the form factor 100 through the personal computing device 410.

Further, primary user computing device 410 may also have a body having an intrinsically valuable base material and one or more jeweled embellishments. The primary user computing device 410 body may also encompass a cavity suited to enclose electronic components. The jeweled embellishments of the primary user computing device 410 may match the jeweled embellishments of the jewelry form factor so as to provide an aesthetically pleasing symmetry.

Any of the software components, processes or functions described in this application may be implemented as software code to be executed by a processor using any suitable computer language such as, for example, Assembly language Java, JavaScript, C, C++, or Perl using, for example, conventional or object-oriented techniques. The software code may be stored as a series of instructions, or commands on a computer readable medium, such as a random-access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

Figure 5:
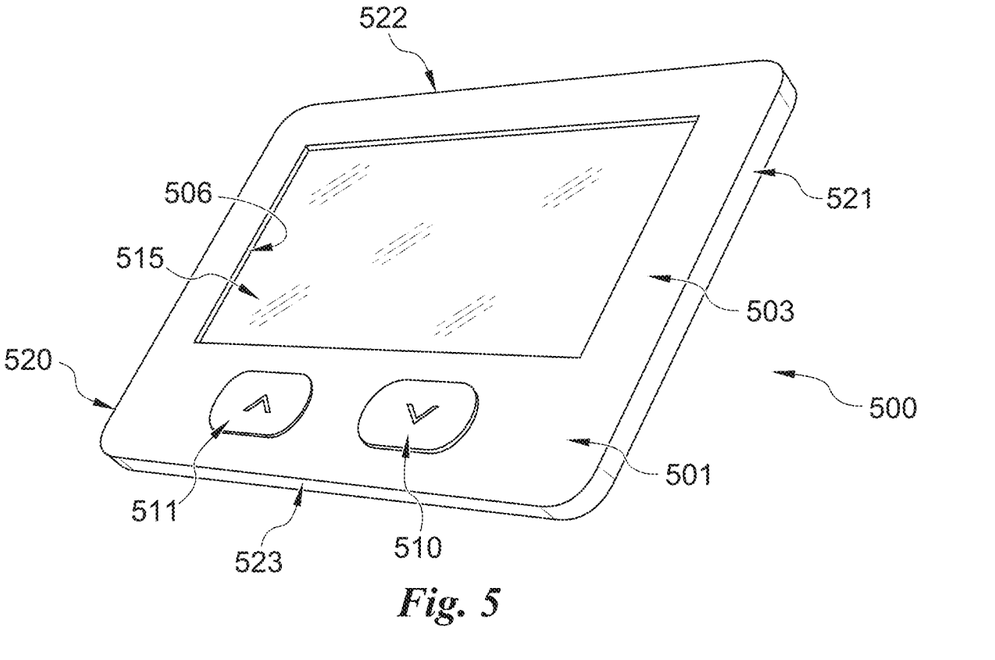
FIG. 5 is a side perspective view of the front of a second embodiment of a jewelry form factor according to an embodiment of the subject matter disclosed herein.

Turning now to FIGS. 5-8, another embodiment of the jewelry form factor is presented and is designated by reference number 500. Similar to the embodiment of FIG. 1, this form factor 500 is rendered as a credit-card like structure (in shape and size) having generally, a flat rectangular shape with dimensions of approximately 86 mm by 55 mm and with a thickness of approximately 3 mm. In this embodiment, the jewelry form factor is intended to be and function as a greeting card that is given from a sender to a recipient. The form factor 500 has a front panel 503 that has a first major surface 501 that may be made of any of the materials discussed herein but is not limited thereto. The first major surface 501, in one embodiment, may be a metal or metal alloy. As shown in FIG. 5, the first major surface 501 defines a window 506 framing a display screen 515 and has two user input buttons 510, 511. As shown in FIG. 5, the form factor 500 has a left side 520, a right side 521, a top side 522, and a bottom side 523. However, if the form factor 500 were to be oval shaped, it would only have one continuous side.

Figure 6:
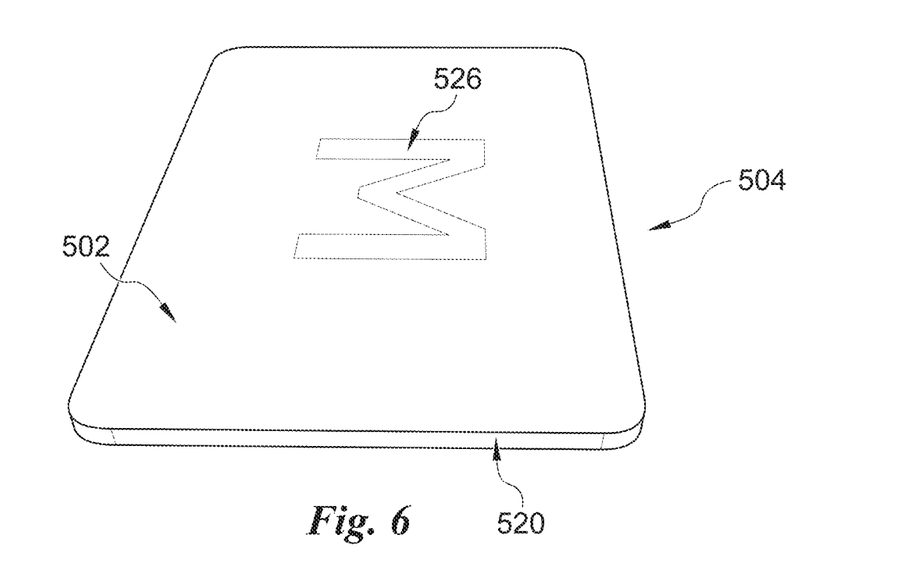
FIG. 6 is an end perspective view of a back panel of a jewelry form factor according to an embodiment of the subject matter disclosed herein.

FIG. 6 is a view of the back panel 504 of the form factor 500 showing the second major surface 502. The second major surface 502, in this embodiment, has an engraved indicia 526 of a letter centered thereon. The second major surface 502 preferably comprises a metal or metal alloy, at least in the centermost region thereon, to define an area for adornment of the form factor. The adornment can include engraving(s), gemstones (real or synthetic), or a combination thereof. The adornment can form a message, a symbol, a geometric shape, a word, a letter, initials, an acronym, an emoji, or any other alphanumeric combination selected by a user.

Figure 7:
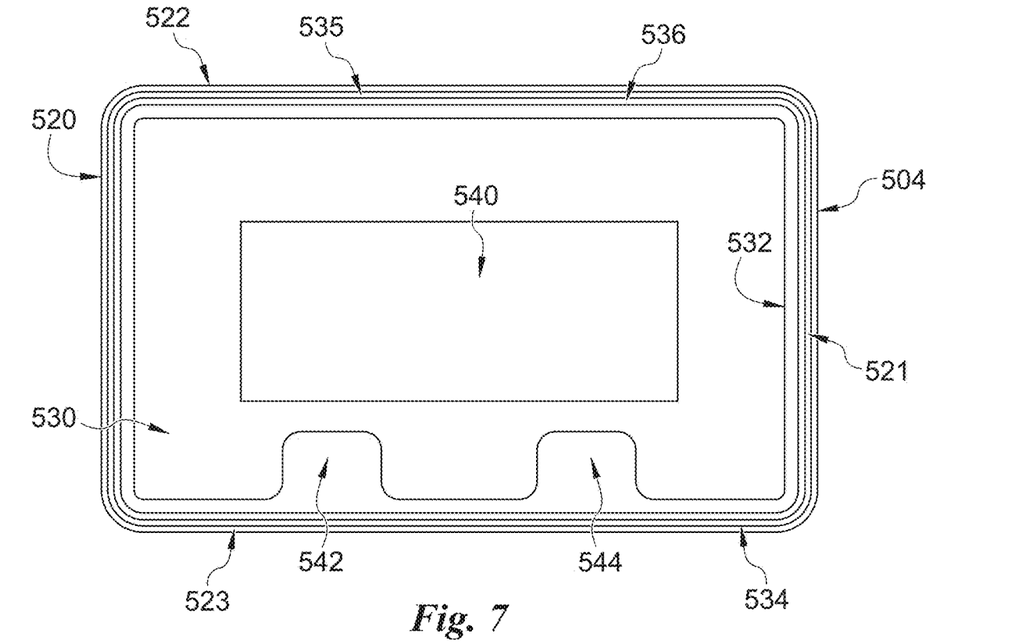
FIG. 7 is a plan view of the interior of the back panel of FIG. 6 according to an embodiment of the subject matter disclosed herein.
Figure 8:
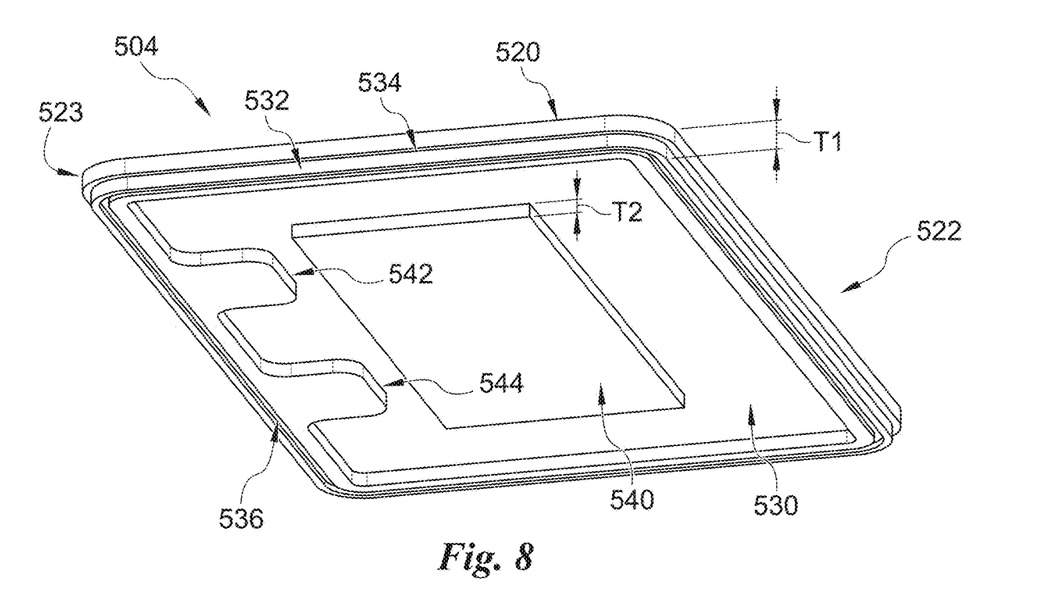
FIG. 8 is an end perspective view of the back panel of FIG. 6 according to an embodiment of the subject matter disclosed herein.

Turning now to FIGS. 7 and 8, an interior view of the back panel 504 is presented. The back panel 504 has a main body layer 530 having a first thickness T1, a peripheral flange 532 extends from the main body layer 530 in a direction toward a front panel, when present. The peripheral flange 532 is a continuous flange running adjacent to each side 520, 521, 522, 523 of the back panel and is positioned a lineal distance inward on the main body layer 530 away from the sides 520, 521, 522, 523 to define a lip 534 along the entire peripheral edge of the main body layer 530. In the interior face 535 of the peripheral flange 532, a trough 536 is present that is continuous therewith. The peripheral flange 532, trough 536, and lip 534 are constructed to mate with an interior feature of a front panel to form a protective hermetic seal for the electronics housed therein.

Of importance for being able to present adornments in the exterior surface of the back panel 504, especially in the centermost region in this embodiment, is a reinforced region 540 that protrudes into the interior cavity of the jewelry form factor 500 and is thicker than the main body layer 530 by an additional thickness T2. As such, the reinforced region 540 has a total thickness of T1 plus T2. The total thickness of the reinforced region 540 is sufficient to set gemstones in the back panel using a traditional jewelry setting. "Sufficient" as used herein means a total thickness in which a gemstone is set without a culet of the gemstone punching or protruding through an interior surface defined by the reinforced region. This total thickness is in a range of 0.8 mm to 1.6 mm. In one embodiment, T1 is 0.8 mm and T2 is 0.5 mm for a total thickness of 1.3 mm. The reinforced region 540 has a surface area that is in a range of ¼ to ½ the surface area of the back panel. The surface area defined by the reinforce region 540 defines an area for adornment on the exterior surface of the back panel. For a cavity with an interior height of at most 2 mm, the reinforced region 540 decreases the cavity's interior height relative thereto, making it even more challenging to have electronic components lying on top of the reinforced region 540. While the reinforced region 540 is shown as being a centermost region in this embodiment, it is not limited thereto. The reinforced region 540 may be offset from the center toward any one or two of the sides. In one embodiment, the reinforced region 540 can be more proximate a corner, be juxtaposed to one of the left or right sides, extend from the top side to the bottom side, or even be oriented at an angle. While the reinforced region 540 is described in detail herein with respect to the back panel, the invention is not limited thereto. The front panel may also or in the alternative include a reinforced region so that one or more gemstones to be set therein. Also, in order to set gemstones in the sides, the total thickness of the sides should be in the same range as the total thickness of the reinforced region.

Still referring to FIGS. 7 and 8, the interior surface of the back panel also includes a button protrusion 542, 544 of additional thickness, similar to the reinforced region 540, aligned one each with any button(s) present in the front panel. Since there are two buttons shown in the front panel 503 of FIG. 5, two button protrusions 542, 544 are present here. In this embodiment, button protrusions 542, 544 are adjacent to bottom side 523 of the back panel 504 and extend inward from the peripheral flange 532.

Figure 9:
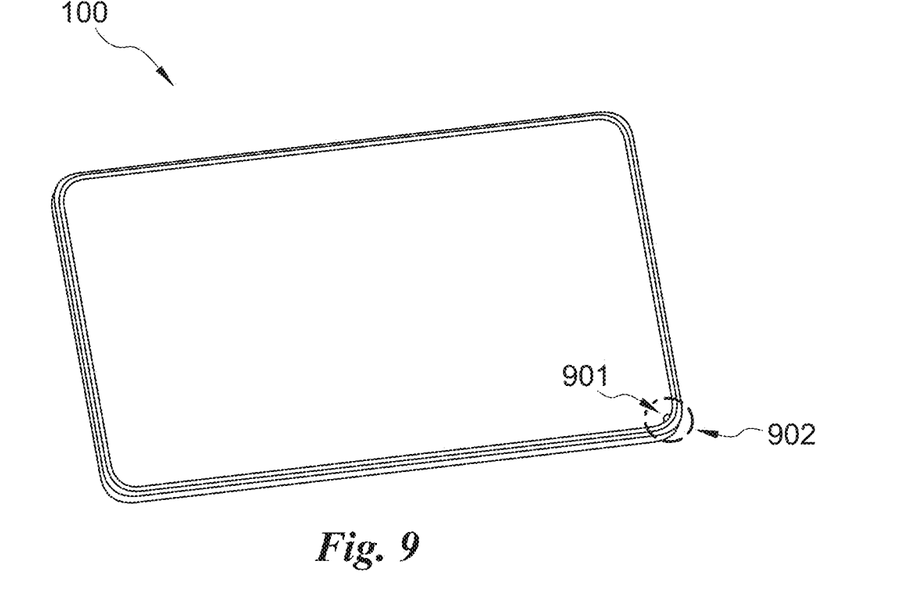
FIG. 9 is a perspective the jewelry form factor of FIG. 1 showing a small button for case access according to an embodiment of the subject matter disclosed herein.

FIG. 9 is a perspective view of the jewelry form factor 100 of FIG. 1 showing a small button 901 for case access according to an embodiment of the subject matter disclosed herein. That is, in order for an artisan to access that which is disposed inside the jewelry form factor 100 (e.g., between the front side and the backside), a small pin hole located on a corner 902 of the form factor 100 allows an artisan to insert a tool to separate two sides of the form factor 100 for internal access. This allows an artisan or technician to access the circuitry and components as described above with respect to FIG. 3 as well as the button componentry as discussed next with respect to FIGS. 10 and 11.

Figure 10:
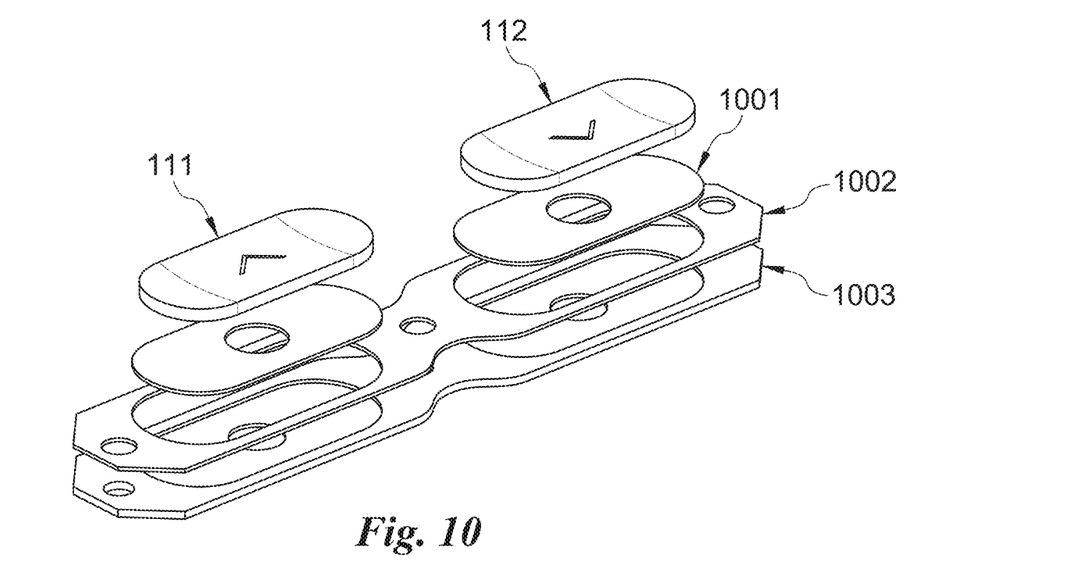
FIG. 10 is an exploded view of jewelry form factor of FIG. 1 showing details of functional buttons according to an embodiment of the subject matter disclosed herein.

FIG. 10 is an exploded view of jewelry form factor of FIG. 1 showing details of functional buttons 111 and 112 according to an embodiment of the subject matter disclosed herein. The buttons may comprise the layers as shown in FIG. 10. This includes buttons 111 and 112, which may be made of any of the same materials discussed above for the back panel or front panel, that are exposed through to the top side of the form factor 100. Below the buttons 111 and 112, there is a respective adhesive layer 1001 designed to adhere the buttons 111 and 112 to a silicon layer below. The next layer is a bed layer 1002 designed to hold the buttons 111 and 112 in place while adhering the top form factor layer (not shown here) to the underlying silicon layer 1003. This silicon layer 1003 imparts functionality between the circuit of FIG. 3 and the buttons 111 and 112.

Figure 11:
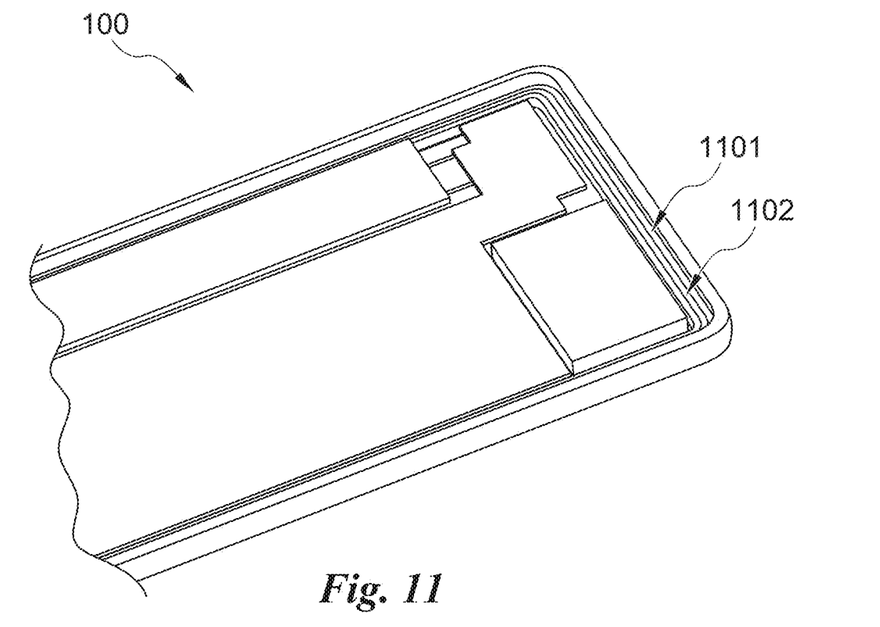
FIG. 11 is a cutaway view of the jewelry form factor of FIG. 1 showing a groove for an adhesive according to an embodiment of the subject matter disclosed herein.

FIG. 11 is a cutaway view of the jewelry form factor 100 of FIG. 1 showing a groove 1101 for an adhesive 1102 according to an embodiment of the subject matter disclosed herein. As waterproofing may be necessary for the jewelry form factor 100, a waterproof adhesive may be used to secure the two sides of the form factor 100 together, i.e., a front panel and a back panel. Thus, a channel or groove 1101 in one side may provide a delimited space for an adhesive 1102 to rest for securing a counterpart side to the one side with the channel/groove 1101.

Figure 12:
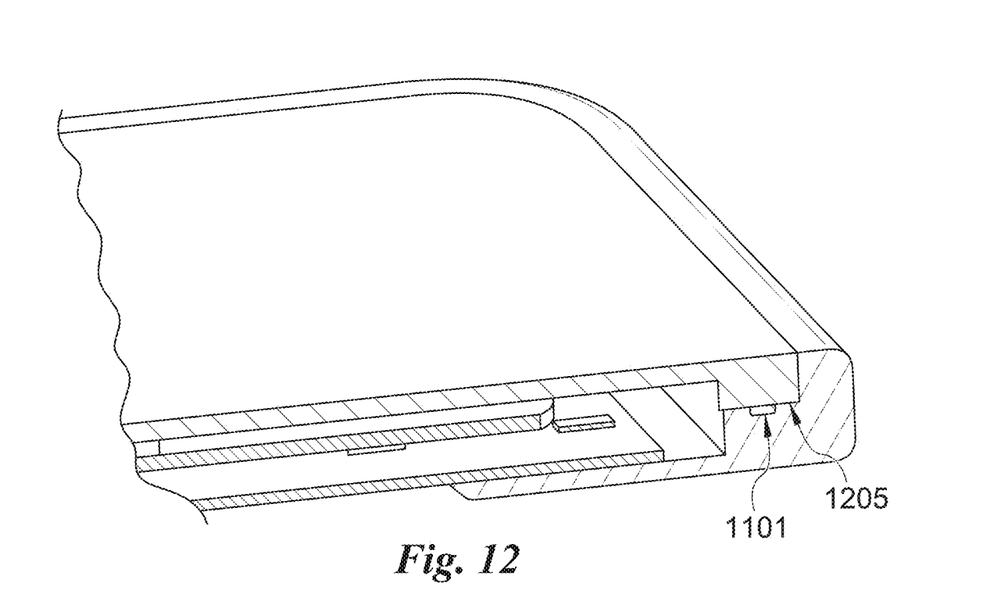
FIG. 12 is a cutaway view of FIG. 11 showing additional detail of the groove for adhesive according to an embodiment of the subject matter disclosed herein.

FIG. 12 is a cutaway view of FIG. 11 showing additional detail of the groove 1101 for adhesive according to an embodiment of the subject matter disclosed herein. Here, a lip 1205 may be shown between a top side and a bottom side of the form factor to further facilitate waterproofing and adhesion.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments, and does not pose a limitation to the scope of the disclosure unless otherwise claimed. No language in the specification should be construed as indicating any non-claimed element as essential to each embodiment of the present disclosure.

Different arrangements of the components depicted in the drawings or described above, as well as components and steps not shown or described are possible. Similarly, some features and sub-combinations are useful and may be employed without reference to other features and sub-combinations. Embodiments have been described for illustrative and not restrictive purposes, and alternative embodiments will become apparent to readers of this patent. Accordingly, the present subject matter is not limited to the embodiments described above or depicted in the drawings, and various embodiments and modifications can be made without departing from the scope of the claims below.

That which is claimed is:

1. A jewelry form factor, comprising:
   a body having a first panel and a second panel mated together to define a cavity suited to enclose electronic components, wherein the first panel has a main body layer having a first thickness and defining an exterior surface thereof and the first panel comprises an area for adornment formed of a metal or metal alloy; wherein the area for adornment protrudes into the cavity and has an additional thickness additive to the first thickness sufficient to set jeweled embellishments therein and has one or more jeweled embellishments set in the area for adornment, the body further comprising a thickness of about 2.0 mm to about 4.0 mm;
   a processor disposed in the cavity and configured to execute computer instructions;
   a memory disposed in the cavity and coupled to the processor, the memory having computer executable instructions to be executed by the processor;
   a display disposed on the exterior of the second panel and coupled to the processor, the display configured to display visual indications on the display in response to the execution of the computer instructions; and a communication module disposed in the cavity and configured to receive and send messages to one or more remote devices in response to the execution of the computer instructions.

2. The jewelry form factor of claim 1, wherein the base material comprises platinum, titanium, aluminum, brass, chromium, iron, manganese, molybdenum, steel, tungsten, vanadium, silver, gold, alloys thereof, or combinations thereof.

3. The jewelry form factor of claim 1, wherein the one or more jeweled embellishments comprise one or more gemstones set in the base material in a pre-determined pattern or location.

4. The jewelry form factor of claim 3, wherein one or more gemstones comprise natural, synthetic, colored, or treated diamonds.

5. The jewelry form factor of claim 1, further comprising a rechargeable battery coupled to the processor and configured to provide power signals to other electronic componentry of the jewelry form factor.

6. The jewelry form factor of claim 5, further comprising a wireless recharging port for receiving a wireless recharging signal to recharge the rechargeable battery.

7. The jewelry form factor of claim 1, further comprising a user input button configured to change a message displayed on the display.

8. The jewelry form factor of claim 7, further comprising a second user input button configured to communicatively engage a remote computing device to exchange electronic messages.

9. The jewelry form factor of claim 1, further comprising an accelerometer coupled to the processor and configured to detect an orientation of the body and change an orientation of messages displayed on the display in response to the detection of the orientation of the body.

10. The jewelry form factor of claim 1, wherein the body comprises a first dimension of about 70 mm to about 90 mm.

11. The jewelry form factor of claim 10, wherein the body comprises a second dimension of about 50 mm to about 60 mm.

12. The jewelry form factor of claim 1, wherein the communication module disposed in the cavity is configured to receive and send messages in real-time as real time communications.

13. The jewelry form factor of claim 1, wherein the cavity comprises a thickness of about 1.0 mm to about 3.0 mm.

14. The jewelry form factor of claim 1, wherein the main body layer has a button protrusion of the metal or metal alloy protruding inward into the cavity, and the front panel defines a frame in which is set the display screen and defines a button opening having seated therein a button positioned in alignment with the button protrusion.

15. The jewelry form factor of claim 14, wherein the first panel and second panel define a credit-card sized structure.

16. The jewelry form factor of claim 1, wherein the first panel has a peripheral flange extending from the main body layer toward the second panel, the peripheral flange being inset a lineal distance on the main body layer away from the sides thereof to define a lip along the peripheral edge of the main body layer.

17. The jewelry form factor of claim 16, wherein the peripheral flange defines a trough in an interior face thereof, the trough being continuous with the peripheral flange.

18. The jewelry form factor of claim 16, wherein the peripheral flange and lip are configured to mate with an interior feature of the second panel to form a hermetic seal.

19. The jewelry form factor of claim 16, wherein the sides of the body have a thickness generally equivalent to the thickness of the area for adornment.

20. A greeting card, comprising:
a body having a first panel and a second panel mated together to define a cavity suited to enclose electronic components, wherein the first panel has a main body layer having a first thickness and defining an exterior surface thereof and the first panel comprises an area for adornment formed of a metal or metal alloy; wherein the area for adornment protrudes into the cavity and has an additional thickness additive to the first thickness sufficient to set jeweled embellishments therein;
a processor disposed in the cavity and configured to execute computer instructions;
a memory disposed in the cavity and coupled to the processor, the memory having computer executable instructions to be executed by the processor;
a display disposed on the exterior of the body and coupled to the processor, the display configured to display visual indications on the display in response to the execution of the computer instructions;
a communication module disposed in the cavity and configured to receive and send messages in real-time to one or more remote devices in response to the execution of the computer instructions;
a rechargeable battery coupled to the processor and configured to provide power signals to other electronic componentry of the jewelry form factor;
a wireless recharging port for receiving a wireless recharging signal to recharge the rechargeable battery;
a first user input configured to change a message displayed on the display; and
a second user input button configured to communicatively engage a remote computing device to exchange electronic messages.

21. A jewelry form factor, comprising:
a body having a base material comprising a metal or metal alloy for at least one surface thereof and one or more jeweled embellishments and/or an engraving set in the metal or metal alloy, the body further comprising a thickness of about 2.0 mm to about 4.0 mm and the body encompassing a cavity suited to enclose electronic components;
a processor disposed in the cavity and configured to execute computer instructions;
a memory disposed in the cavity and coupled to the processor, the memory having computer executable instructions to be executed by the processor;
a display disposed on the exterior of the body and coupled to the processor, the display configured to display visual indications on the display in response to the execution of the computer instructions;
a level translator in series with a voltage booster in operative communication between the processor and the display; and
a communication module disposed in the cavity and configured to receive and send messages to one or more remote devices in response to the execution of the computer instructions.

* * * * *